United States Patent [19]
Boaz

[11] Patent Number: 5,150,665
[45] Date of Patent: Sep. 29, 1992

[54] BIRD POWER FEEDER

[76] Inventor: John M. D. Boaz, 14222 Rock Canyon Dr., Centreville, Va. 22020

[21] Appl. No.: 748,546

[22] Filed: Aug. 22, 1991

Related U.S. Application Data

[63] Continuation-in-part of Ser. No. 594,626, Oct. 9, 1990, abandoned.

[51] Int. Cl.⁵ .......................................... A01K 39/00
[52] U.S. Cl. ................................................. 119/52.3
[58] Field of Search ................. 119/52.1, 52.2, 52.3, 119/52.4, 51.01, 57.8, 57.9

[56] References Cited

U.S. PATENT DOCUMENTS

| | | | |
|---|---|---|---|
| 1,005,071 | 10/1911 | Randall | 119/52.1 |
| 1,222,389 | 4/1917 | Goelzer | 119/52.1 X |
| 2,884,899 | 5/1959 | Jackes et al. | 119/521 X |
| 3,568,641 | 3/1971 | Kilham | 119/57.8 |
| 4,188,913 | 2/1980 | Earl et al. | 119/57.9 |
| 4,259,927 | 4/1981 | Clarke | 119/52.3 X |
| 4,327,669 | 5/1982 | Blasbalg | 119/57.8 |

FOREIGN PATENT DOCUMENTS 8649 of 1911 United Kingdom ............... 119/52.1

Primary Examiner—Gene Mancene
Assistant Examiner—Thomas Price
Attorney, Agent, or Firm—Aquilino & Welsh

[57] ABSTRACT

The bird feeder of this invention includes a reservoir which is generally conical in shape and having a plurality of feeding holes. A door is connected at the top of the reservoir and a conductive tray at the bottom. The conical shape provides a large opening through which the food may be poured. The conductive tray is connected by an electrical network to one or more of the conductive perches or trim mechanisms to form an open electrical circuit. The circuit is closed by contact with an animal to thereby provide a shock. The device further includes a baffle for separating the interior of the reservoir into independent compartments and trim mechanisms which are inserted into the feeding holes in order to vary the size of opening cooperating with the feed hole.

22 Claims, 4 Drawing Sheets

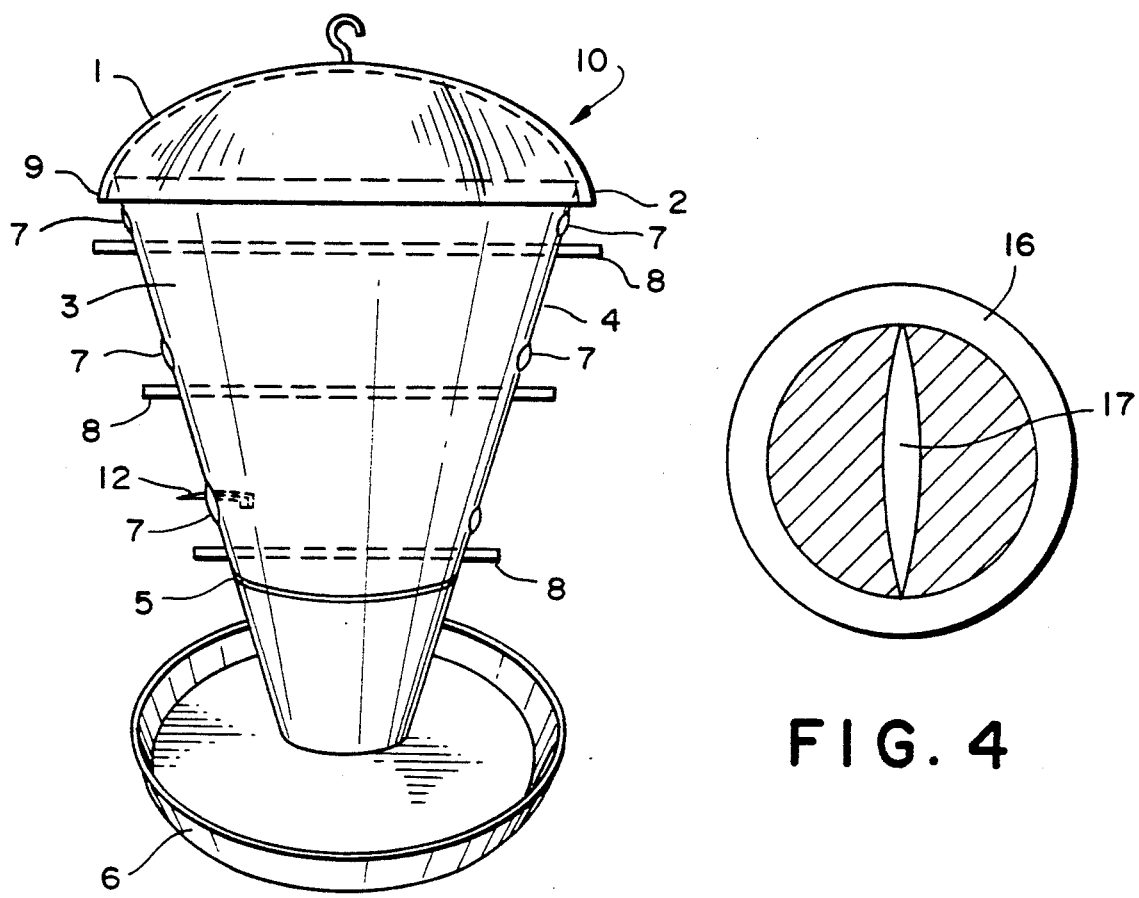
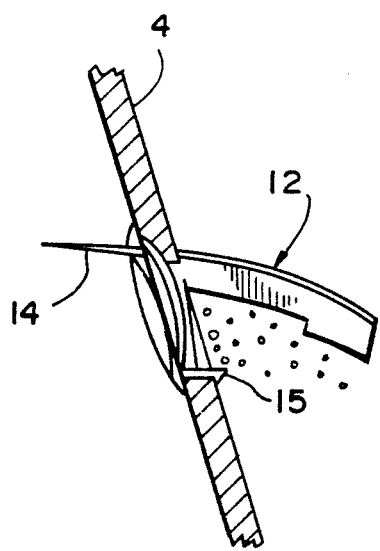
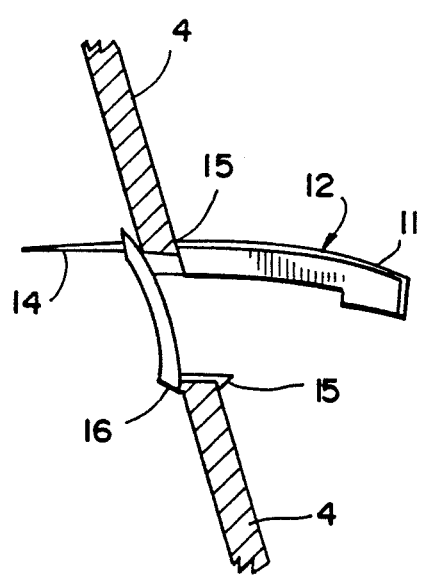
FIG. 1
FIG. 4
FIG. 2
FIG. 3

BIRD POWER FEEDER

This is a Continuation-in-Part of Ser. No. 07/594,626, filed Oct. 9, 1990, now abandoned.

FIELD OF THE INVENTION

The invention relates to bird feeders, more particularly a bird feeder which is electrically powered in order to shock squirrels, larger birds or other animals which often eat food intended for smaller birds. Squirrels can consume large quantities of food very rapidly and their aggressive nature intimidates the more passive birds and large aggressive birds discourage smaller birds from appropriation of the available supply of food. The bird feeder of this invention, because of its geometric design, allows for the rapid refilling of food which is a problem with most bird feeders, as most bird feeders only have small openings through which to pour seeds. The present invention addresses and overcomes the shortcomings of the prior art.

SUMMARY OF THE INVENTION

This invention is a bird feeder designed with an inverted cone shaped or other geometric-shaped reservoir having a wide top opening. At the top of the feeder is a door designed as a baffle so squirrels have difficulty resting upon it. The top end of the inverted cone shaped reservoir provides the unusually wide access opening for the purpose of replenishing the food supply quickly and easily. The walls of the reservoir recede inward from top to bottom, which enhances flow of the food downward to a central accessible area eliminating areas of non-access to the food. Holes are provided in the walls for access to food in various locations, through various sized openings, so birds of different sizes and species can feed at the same time.

The access holes for feeding are finished with a trim mechanism which is held in position by the tension of its plastic housing or a friction fastener. Each trim mechanism may be equipped with a sized opening desirable for the type of bird which is desired to be fed. The internal portion of the trim mechanism prevents food from escaping outside, while the external portion helps deflect rain from entering the reservoir. The perches are arranged so there is an option as to how long you want them to extend outside of the bird feeder wall. The combination of the sloping walls and the length of the perch determines the level of comfort a given size of bird may enjoy while feeding. Larger birds generally find it more awkward to sit on small perches close to the wall.

The object is to provide a quick loading, squirrel deterrent bird feeder which allows the owner the option of attracting the birds desired and discourage those not wanted at a particular feeding holes.

It is a further object to provide a bird feeder which is electrically powered such that simultaneous contact of both a conductive perch and a conductive feeding tray completes a circuit allowing the animal which completes the circuit to be shocked while not inflicting injury to it. At the same time birds are generally unable to complete the circuit so that they are not affected in any way.

DESCRIPTION OF THE DRAWINGS

FIG. 1 is a perspective view of a first embodiment of the invention.

FIG. 2 is a side view showing a feeder hole trim mechanism which restrains the food inside and diverts the rain outside.

FIG. 3 is a side view showing a friction method of holding the feeder hole trim mechanism of FIG. 2 in place.

FIG. 4 is a front view showing the feeder hole trim mechanism of FIG. 2.

DESCRIPTION OF THE INVENTION

Figure 7:
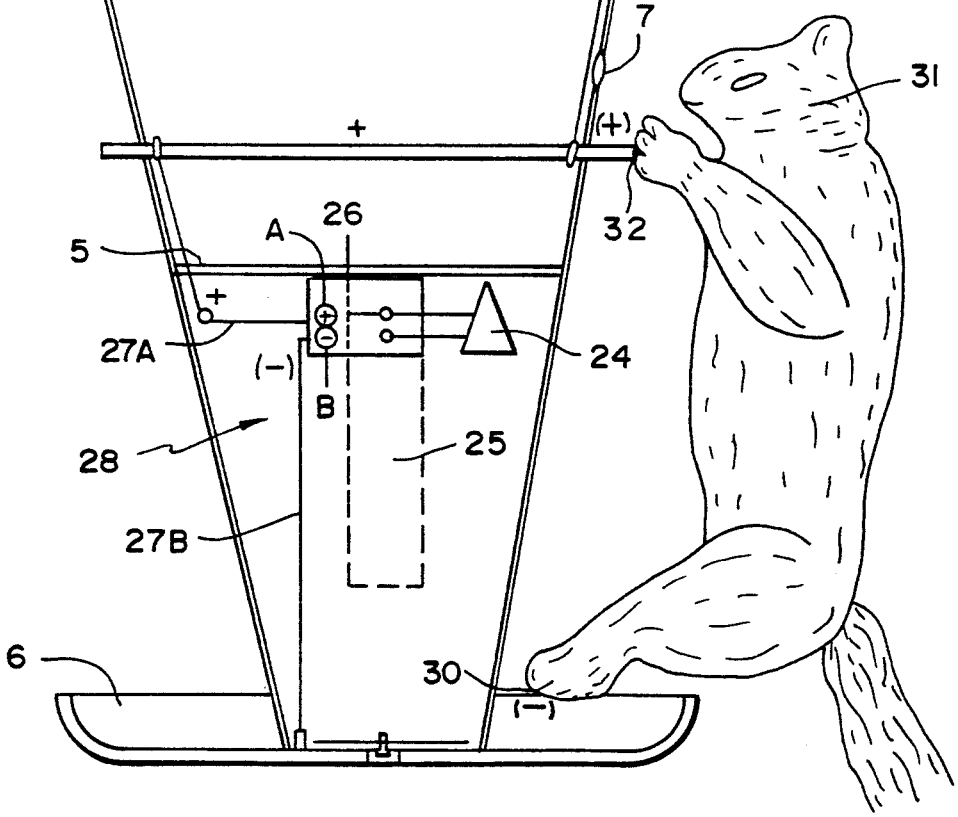
FIG. 7 is a side view of the reservoir showing an electrical circuit for producing the irritation to an animal.
Figure 8:
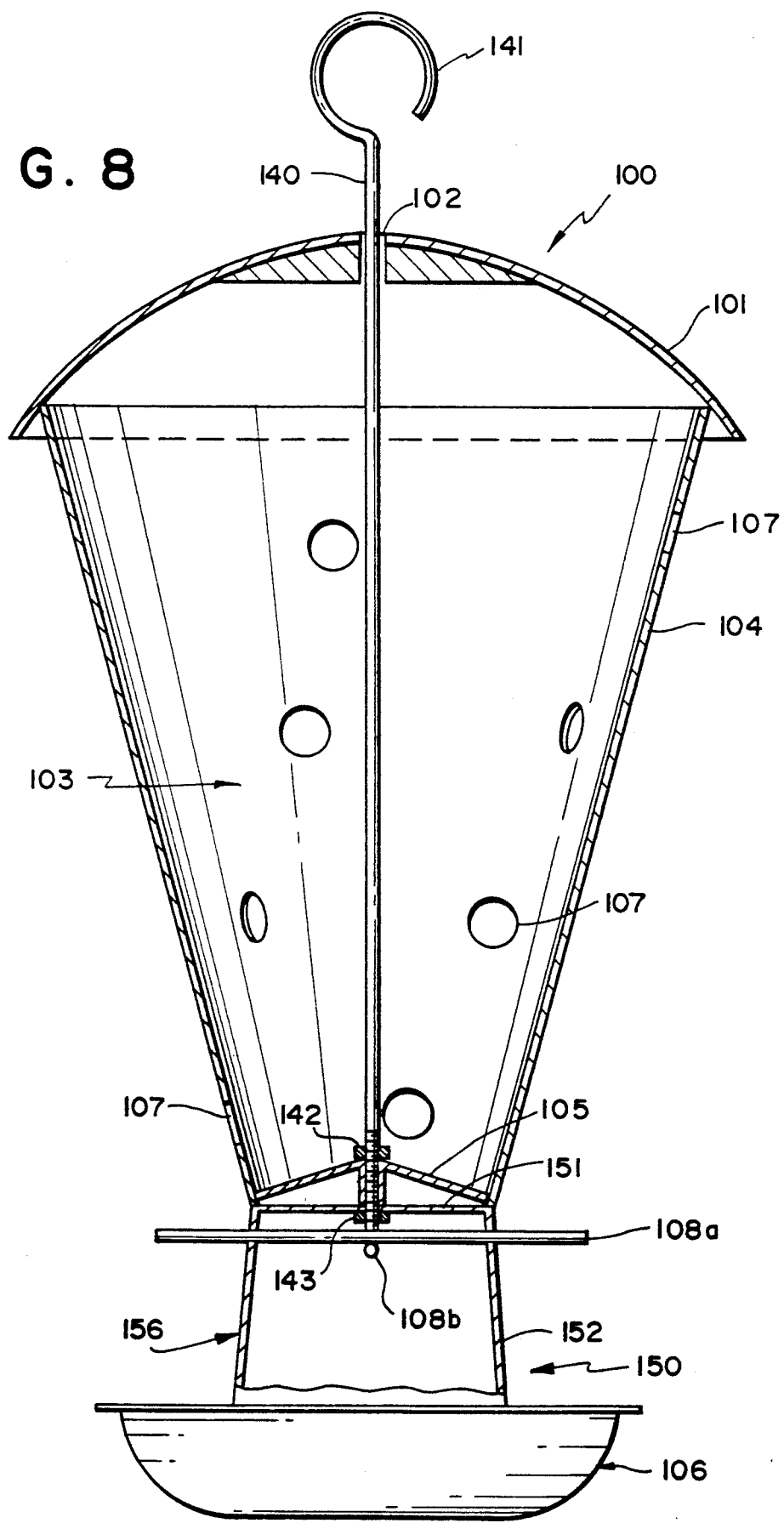
FIG. 8 is an elevational view of a second embodiment of the invention.

With reference to the drawings, the bird feeder 10 has a door 1 made of rigid plastic material, flexible enough to allow simple quick release of the latch 2 for opening. The door 1 provides a wide smooth rounded surface to form a squirrel baffle and (cooperates with the inverted cone shaped reservoir 3) to provide an unusually large access for rapid loading of large quantities of food. The door 1 can be pivotally attached to the inverted cone shaped reservoir 3 as shown by pivot means 9. The cone shaped cylindrical walls 4 of the reservoir 3 are formed from plastic. The walls 4 of the reservoir 3 are spaced by a greater diameter at the top than at the bottom to assure gravitational flow and it allows access to all the food down to the bird feeder floor 5. The floor 5 may be spaced from the bottom of the reservoir 3 to allow for electrical components as shown in FIG. 7.

The feeding tray 6 at the bottom of the reservoir walls 4 provides a platform for birds to eat seeds which may escape from above. The tray 6 may also be conductive and acts as the ground terminal to complete the circuit and render a shock to squirrels, cats, raccoon or other intruders, which will be discussed in detail later.

Figure 6:
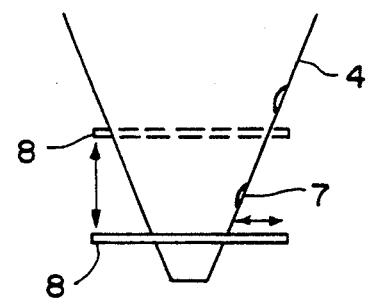
FIG. 6 is a side view depicting movement of a perch from a higher access hole to a lower access hole in order to change the length extending from the sloping walls of the reservoir.

Feeding or access holes 7 are placed in the walls 4 in positions staggered about the circumference of the reservoir 3. Holes 7 are formed through the slanted wall 4 of the reservoir 3 to provide access to the food. The position of each access hole 7 is located above a perch 8. These perches 8 upon which birds rest in conjunction with the slanted walls 4 may determine the size of bird to be fed at a particular access hole 7. The perches 8 are made from conductive material and come in various lengths. By positioning longer perches to cooperate with access holes near the bottom of the reservoir 3 larger birds are encouraged to feed therefrom as there is more room. Thus, because of the slope of the reservoir walls 4 and the different length perches 8 one can try to encourage different sized birds to feed at selected access holes. FIG. 6 illustrates the movement of perch 8 to cooperate with a lower access hole 7, thereby allowing a large amount of the perch 8 to extend from the reservoir wall 4.

FIG. 2 exhibits tubular type feeding trim mechanisms 12 which are inserted into the access or feeding holes 7. The feeding trim mechanisms 12 include a circular front flange 16. The diameter of the flange 16 is greater than the diameter of access hole 7 such that the flange 16 engages the exterior of the wall 4 about the periphery of the access hole. The front flange 16 prevents the feeding trim mechanism 12 from being completely pushed into the interior of the reservoir 3 during installation. The top of the feeding trim mechanism 12 includes an interior baffle 11 and an exterior baffle 14. The exterior baffle 14 acts to deflect rain or snow. The interior baffle 11 can have many configurations and functions to deflect the bird food so that it does not pour out of the opening 17 in the feeding trim mechanism 12. The opening 17 is as shown in FIG. 4 located within the inner diameter of flange 16. The opening could be of various sizes in order to provide different size feed holes. Smaller openings require less deflection inside the reservoir which allows the seed to press closer to the wall 4. Coordinating the size of opening 17 with the various length of perches 8 assists in further influencing which type of birds will feed at a given feeding or access hole.

The feeding hole trim mechanism 12 are installed in the wall 4 by the use of snap fit friction elements 15. A trim mechanism 12 is inserted in the exterior of wall 4 and then pushed until friction element 15 makes snug engagement with the interior of wall 4.

Figure 5:
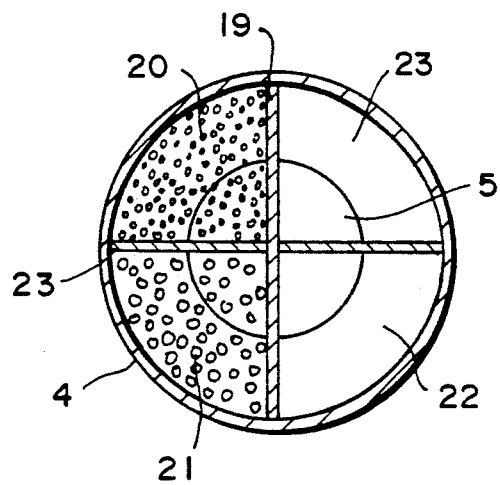
FIG. 5 is a top view looking down into the reservoir showing an optional baffle used for separation of various seeds.

FIG. 5 exhibits a view looking down inside of the bird feeder with the top door 1 open. You can see the lower area of the reservoir cone becoming narrower as it reaches the floor 5. A baffle 19 is inserted to provide four separate compartments where you may place four different seeds. For example thistle, smaller seed in area 20 while placing larger sunflower seeds in area 21, while leaving area 22 and 23 empty at your option. The baffle 19 and the bird feeder walls 4 are maintained in contact by gravity. If one desires the entire baffle 19 may be removed for easy cleaning of the bird feeder. The baffle 19 allows one to mix various foods with appropriate size feeding holes 17 which again can influence what type bird eats from what hole. As for example small seed can be placed in one quarter of the reservoir to cooperate with small openings 17 and short length perches, thereby attracting smaller birds and discouraging larger birds.

FIG. 7 exhibits an electrical system 28 used to induce an electrical shock to animals such as squirrels. The electrical shock device 28 is located within a cavity above the feeding tray 6 and below the feed reservoir floor 5. As shown the electrical system contains a capacitor switch 24, a battery or electrical power means 25, and a voltage transformer 26 for increasing or decreasing current to produce the desired high voltage output 27. A condenser or other device may be used to control the current pulse and output. The low voltage from the battery 25 passes through the voltage multiplying transformer 26 to create high voltage traveling from terminal A through a wire or strap 27A to the lowest conductive perch 8. To the lowest perch 8 is attached a wire or strap conducting current to the next perch 8 until each perch 8 is capable of conducting current through it. It should also be understood that each feeding hole 7 could be conductive by wiring the trim mechanisms 12. A wire or strap 27B connected to terminal B is connected to the conductive tray 6.

A bird is not shocked because it sits on a perch 8 without contacting the tray 6 or it sits in the tray 6 without contacting the perch rod 8 at the same time. However, the squirrel 31 will sit on the tray 6 making contact with his feet 30 and then reach for the feeding hole 7 located above the perch 8. The squirrel 31 will at some point touch the perch rod 8 and receive a shock because the circuit has been completed. The electrical circuit is completed at contact points 30 and 32, as shown in FIG. 7.

A capacitor switch 2 operates to turn the battery off during times when no animals are present. This prolongs the life of the battery.

The second embodiment of the invention ill now be discussed with reference to FIGS. 8-13.

The bird feeder 100 includes a door 101 in the form of a squirrel baffle. The door has an aperture 102 which matingly engages connecting rod 140. Rod 140 is preferably made from metal and includes a hook 141 at one end and is threaded at its other in order to receive a thread fastener 143. When hanging, the door 101 slides down the rod 140 due to gravity, and if desired, can be attached to the side walls 104. To fill the bird feeder of this embodiment, one only needs to slide the door 101 up the rod 140 to gain access to the top of the reservoir 103.

The connecting rod 140 also functions to secure the reservoir 103 to the electronic housing 156 of the feeding tray assembly 150. The rod 140 passes through an aperture in the floor 105 and through aperture 145 in the electronic housing 156 and secures the reservoir 103 to the housing 156 by threaded fasteners 143 or optionally by threaded fasteners 142 and 143.

The electronic housing 156, the perches 108 and the conductive feeding tray 106 now form a self-contained shock unit which can be made waterproof, thereby preventing the electronics from becoming damaged due to the exposure to water. An exploded view of the unit can be seen in FIG. 9.

Figure 9:
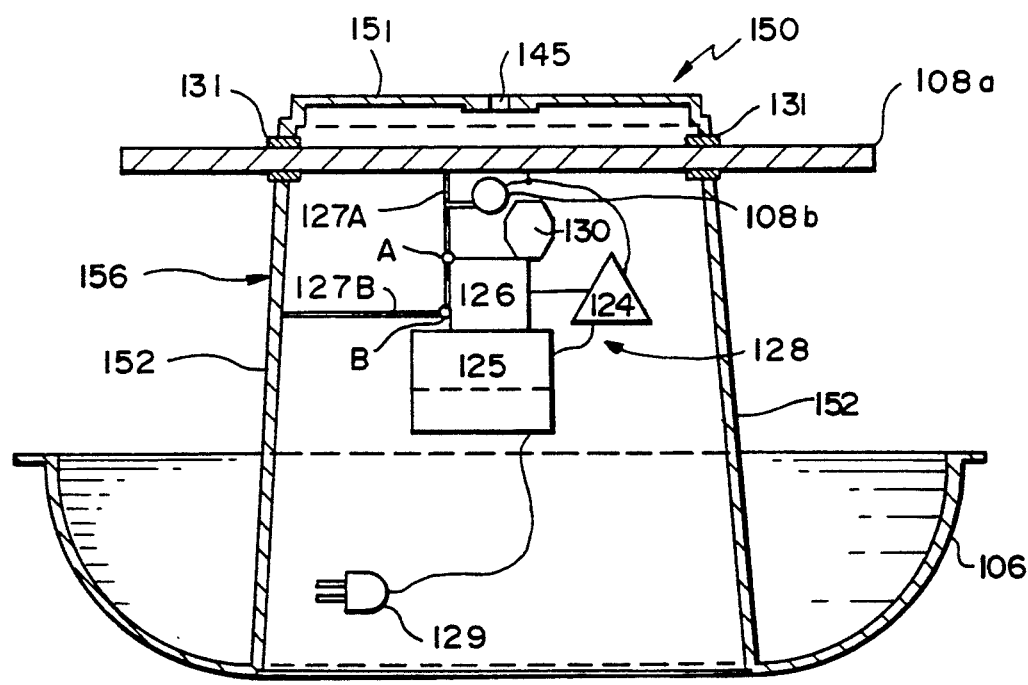
FIG. 9 is a sectional view of a detail of FIG. 8.

The feeding tray assembly 150 comprises a housing 156 which includes a top wall 151 and side walls 152 that connect with feeding tray 106. The electrical system 128 as shown in FIG. 9 is similar to that previously described and can be powered by either AC or DC current and is just one example of an electrical shock circuit means that could be used. Thus the shock unit is adapted to have a watertight battery access compartment 125 or an electric cord 129 extending therefrom.

The system 128 includes a capacitor switch 124 which functions to turn the power means 125 on and off when an animal such as a squirrel is near, thereby conserving energy. The electrical power can come from a battery or from a plug and cord assembly 129 connected to an alternating current source. Once the system 128 is activated, voltage converting transformer 126 either increases or decreases the voltage being produced. The transformer includes a positive terminal A and a negative terminal B which are connected through wire 127A to a perch 108 or a trim mechanism 112 rendering them positively conductive and through wire 127B to a portion of the feeding tray assembly 150 to render it negatively conductive. Since perches 108 extend through insulators 131 in housing 156, an open circuit is formed. This circuit will be closed and render a shock when the positive terminal A and any extension thereof and negative terminal B and any extension thereof are simultaneously contacted. The level of current produced and the duration of the current maintained at any level is controlled by condenser 130 or other such device.

Since the shock producing unit is now self-contained, it can be readily adapted to be attached to any bird feeder.

Figure 10:
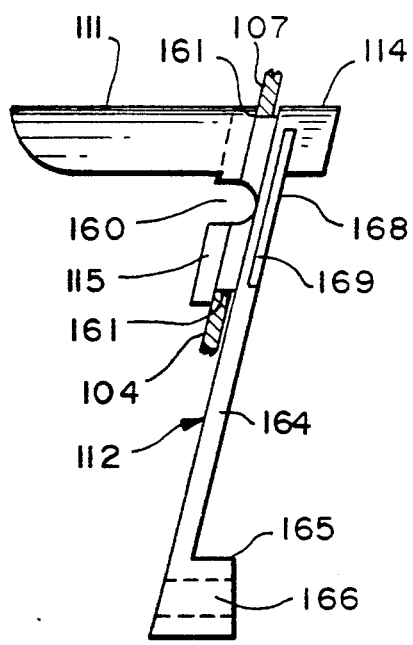
FIG. 10 is a side view of a second type of feeder hole trim mechanism.
Figure 11:
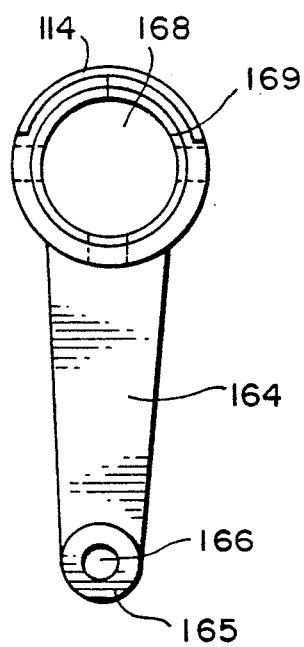
FIG. 11 is a front view of the feeder hole trim mechanism shown in Figure 10.
Figure 12:
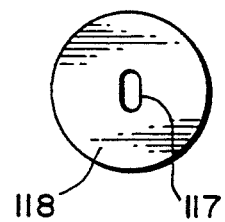
FIG. 12 is a front view of the pop-in disc.
Figure 13:
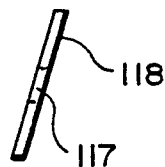
FIG. 13 is a side view of the pop-in disc.

The trim mechanism 112 differs from that of the first embodiment and is shown in FIGS. 10 and 11. The trim mechanism 112 again includes an interior baffle 111 and an exterior baffle 114, and is frictionally retained within feeding holes 107. Trim 112 is frictionally maintained in place by interior baffle 111 and friction element 115 which are separated by a cutout 160, thereby allowing the interior baffle 111 and the friction element 115 to move towards one another as the trim is pushed through a feeding hole 107. The baffle 111 and the friction element 115 snap back to their normal separated distance once the trim 112 is pushed far enough so that reduced diameter ledge 161 engages the periphery of feeding hole 107.

The trim mechanism 112 also includes two other unique features. The first feature is the perch securing means 165 spaced from the feeding hole 106 by extension 164. The perch securing means 165 has a bore 166 for receiving and securely holding any length perch 108. This feature eliminates the placement of any perch holes in the reservoir side walls and thus has been found to eliminate water from travelling into the reservoir from around the perches.

The second feature is the removable pop-in disc 118 with various sized opening 117. Disc 118 is frictionally retained in trim 112 by simply pushing it into aperture 168 which has a back stop wall 169.

It will be appreciated that various changes and modifications may be made in the foregoing specification in keeping within the spirit and scope of the invention as defined in the following claims.

I claim:

1. A bird feeder for feeding multiple sized birds comprising:
   a hollow geometrically shaped reservoir with a top opening an sidewalls which extend down to a bottom;
   a door at the top of said reservoir shaped to close the top opening;
   a feed tray assembly attached to the bottom of said reservoir; and,
   a plurality of access holes through the sidewalls of said reservoir;
   a removable trim mechanism engaging one or more of said access holes, wherein each trim mechanism includes a snap-fit connection means, an opening, and a removable disc positioned in said opening for varying the size of said access hole.

2. The bird feeder of claim 1 wherein said hollow geometrically shaped reservoir includes tapered side walls.

3. The bird feeder of claim 2 wherein said reservoir is conical.

4. The bird feeder of claim 1 wherein said trim mechanism further includes a perch securing means, an extension for spacing said perch securing means radially from said access hole and a perch located in said perch securing means.

5. The bird feeder of claim 1 wherein said feeding tray assembly includes a housing for an electrical circuit means and a feeding tray.

6. The bird feeder of claim 1 wherein said door, said reservoir and said feeding tray assembly are connected together by an elongated rod with a hook at one end and a threaded fastener means at its other end.

7. The bird feeder of claim 1 wherein a portion of said feeding tray assembly and a selected one or more of said perches or trim mechanisms are conductive and are interconnected by an open electrical circuit means which will close and give an electrical shock when a portion of said feeding tray and any one of said selected perches or trim mechanisms are simultaneously contacted.

8. The bird feeder of claim 7 wherein the electrical circuit means includes an electrical power means, a voltage converting transformer, control means and a capacitor switch to turn the power on when an animal is near.

9. A bird feeder for feeding multiple sized birds comprising:
   a hollow geometrically shaped reservoir with a top opening and sidewalls which extend down to a bottom;
   a door at the top of said reservoir to close the top opening;
   a feed tray assembly attached to the bottom of said reservoir;
   one or more access holes through the sidewalls of said reservoir;
   at least one trim mechanism cooperating with one of said access holes;
   at least one perch located below one of said access holes; and,
   wherein a portion of said feed tray assembly and a selected one or more of said perches or trim mechanisms are conductive and are interconnected by an open electrical circuit means which will close and give an electrical shock when a portion of said feeding tray and any one of said selected perches or trim mechanisms are simultaneously contacted.

10. The bird feeder of claim 9 wherein the electrical circuit means includes an electrical power means, a voltage converting transformer, control means and a capacitor switch to turn the power on when an animal is near.

11. The bird feeder of claim 9 wherein said feeding tray assembly includes a housing for said electrical circuit means and a feeding tray.

12. The bird feeder of claim 11 wherein at least one conductive perch is located in the housing, said electrical circuit means is enclosed within said housing and a portion of said feeding tray assembly is conductive in order to form a self-contained electrical shock unit which can be maintained watertight.

13. The bird feeder of claim 9 wherein said hollow geometrically shaped reservoir includes tapered side walls.

14. The bird feeder of claim 13 wherein said reservoir is conical.

15. The bird feeder of claim 9 wherein one or more access holes contains a snap fit trim mechanism with a removable disc for varying the size of the opening of said access hole.

16. The bird feeder of claim 9 further including a baffle which cooperates with the reservoir walls to separate the interior of the reservoir into a plurality of compartments.

17. A bird feeder for feeding multiple sized birds comprising:

a hollow geometrically shaped reservoir with a top opening and sidewalls which extend down to a bottom;

a door shaped as a squirrel deterrent baffle connected at the top of said reservoir to close the opening;

a feed tray attached to the bottom of said reservoir;

at least one access hole through the sidewall of said reservoir;

a perch located below each access hole; and, said feed try and at least one of said perches being conductive and are interconnected by an open electrical circuit means which will close and give an electrical shock when said feeding tray and any one of said perches are simultaneously contacted.

18. The bird feeder of claim 17 wherein said trim mechanism includes a flange and said predetermined sized openings are dimensioned to release different size seeds.

19. The bird feeder of claim 17 wherein said trim mechanism includes a snap fit friction element for engaging the wall of said reservoir.

20. The bird feeder of claim 17 further including a removable trim mechanism engaging each of said access holes, wherein each trim mechanism includes a predetermined sized opening which cooperates with an access hole in order to optionally change the size of said access hole and, said trim mechanism further including an exterior and an interior baffle portion.

21. The bird feeder of claim 20 wherein the electrical circuit means includes a battery, a voltage multiplying transformer, and a capacitor switch to turn the battery on when an animal is present.

22. A self-contained electrical shock unit for attachment to a bird feeder, comprising:

a feeding tray assembly having a housing and a feeding tray which together form an enclosure for an electrical shock circuit;

at least one perch extending into the housing but spaced from the housing; and, an open electrical circuit means interconnected between a portion of said feeding tray assembly and at least one perch, rendering both conductive so that an electrical shock will result when the circuit is closed by simultaneous contact of said portion of said feeding tray and of said perch.

* * * * *

UNITED STATES PATENT AND TRADEMARK OFFICE
CERTIFICATE OF CORRECTION

PATENT NO. : 5,150,665
DATED : September 29, 1992
INVENTOR(S) : John M. D. Boaz

It is certified that error appears in the above-indentified patent and that said Letters Patent is hereby corrected as shown below:

Column 5:
Claim 1, line 4, replace "an" with --and--.
Column 7:
Claim 17, line 12, replace "try" with --tray--.

Signed and Sealed this

Twentieth Day of September, 1994

Attest:

BRUCE LEHMAN

Attesting Officer     Commissioner of Patents and Trademarks